Patented Dec. 11, 1951

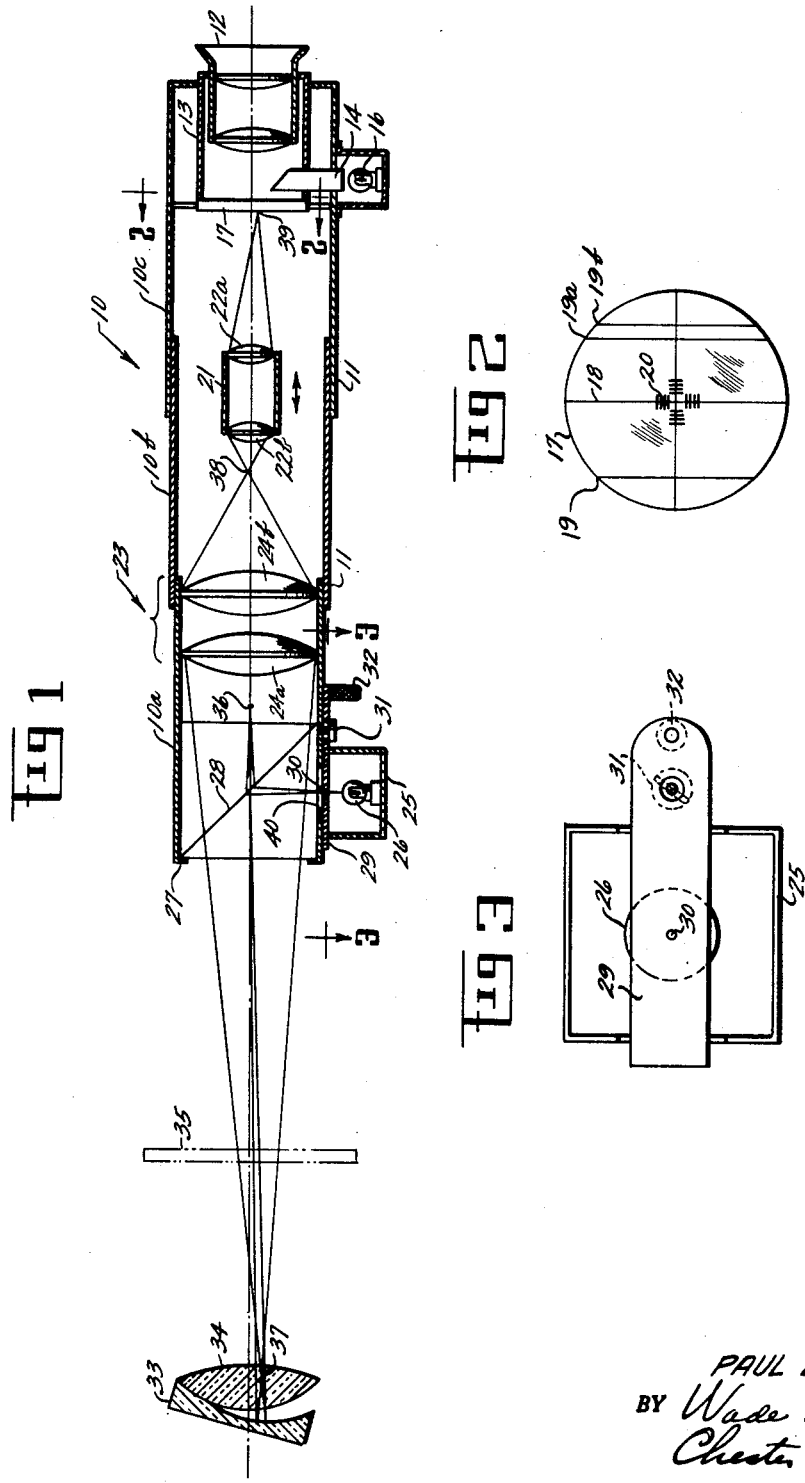

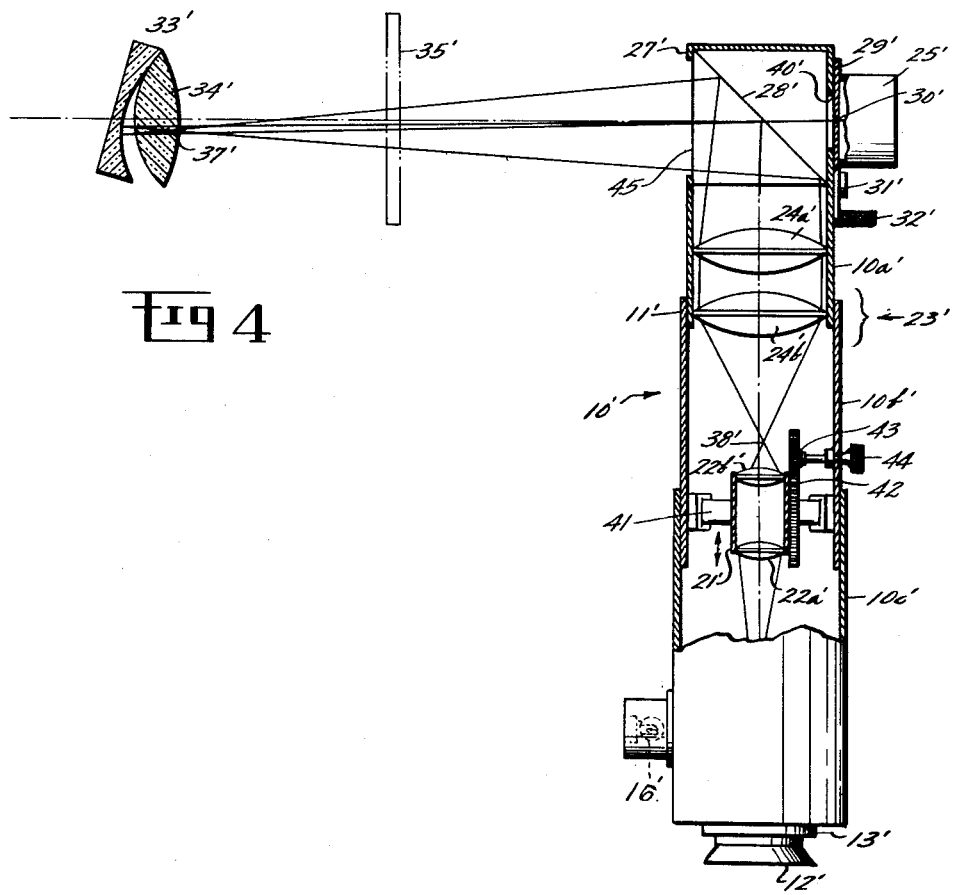

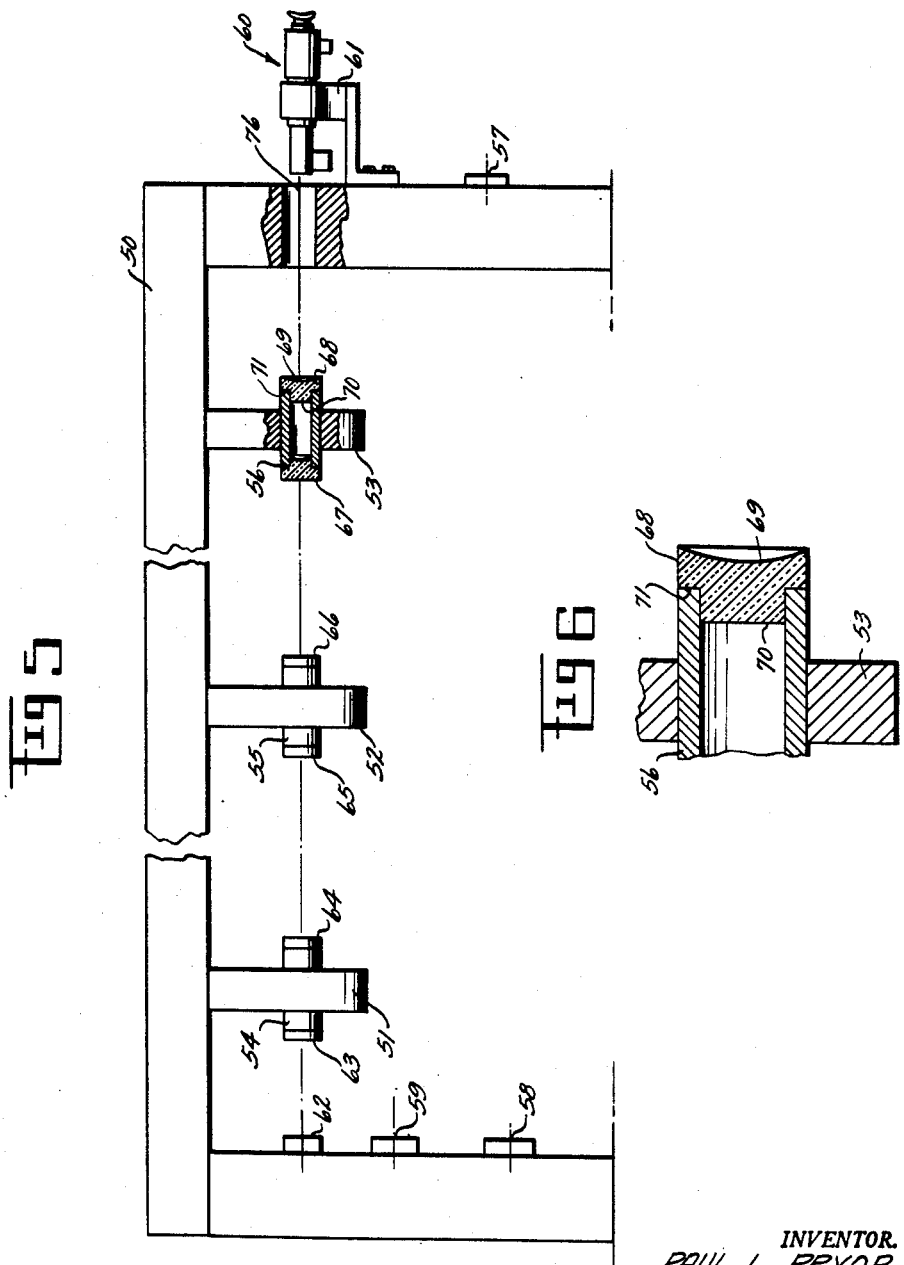

2,577,807

UNITED STATES PATENT OFFICE 2,577,807

TELESCOPE FOR ALIGNING LENSES, JIGS, AND THE LIKE

Paul L. Pryor, Dayton, Ohio

Application November 13, 1946, Serial No. 709,635

9 Claims. (Cl. 88—2.2)

(Granted under the act of March 3, 1883, as amended April 30, 1928; 370 O. G. 757)

The invention described herein may be manufactured and used by or for the Government for governmental purposes without payment to me of any royalty thereon.

This invention relates to an instrument of the telescope class which is useful for checking the alignment of the lenses of optical systems and for checking the alignment of structures, for example, jigs such as are used in assembling large machines and the like.

At present lenses are checked for alignment by the use of a collimator or by rotating the lens and observing the reflections or movement of the image. The alignment of large jigs is checked by means of large expensive "masters" or by various crude methods. Among such methods are the use of stretched piano wire, spirit levels, theodolites, etc. The present instrument is an improvement on previous means for accomplishing these results, because, as one advantage, a check can easily be made to ascertain that the instrument itself is not out of alignment.

An object of the invention is to provide an instrument which can be visually focused on reflections or targets without disturbing its axis and is therefore more accurate for alignment checking purposes than previous instruments.

Another object is to provide an instrument which is compact, self-contained and capable of being built in both horizontally and vertically mountable forms.

Another object is to provide an instrument that may be checked by auto-collimation.

Another object is to provide an instrument which can utilize the reflections from both planes and curved reflecting objects to locate the direction of the normal to the surface of the object at a given position. Hitherto, the Gauss type eyepiece has been the main tool available for locating normals to surfaces. This tool is useful only on plane surfaces.

Referring now to the drawings:

Fig. 1 is a side elevation of one form of the device, in section. It is diagrammatic to the extent of showing a section of a lens to be tested which is out of proper alignment. The path of the light rays from the instrument to the lens or reflecting exterior target and return, is indicated;

Fig. 2 is a front elevation of the reticle taken on the line 2—2 of Fig. 1;

Fig. 3 is a longitudinal section of the light box for the front mirror taken on the line 3—3 of Fig. 1;

Fig. 4 is an elevation, partly in section, of a modification of the telescope, this form being adapted to vertical instead of horizontal mounting. Misaligned lenses to be corrected are also shown in this view;

Fig. 5 is an elevation, partly in section, of an airplane-building jig for lining up aileron hinges. The aligning telescope is shown mounted on the right side of the jig; and Fig. 6 is a longitudinal section of one hinge bearing and of an exterior reflecting target mounted therein.

In Fig. 1, 10 is a tube, preferably of brass, which is made in preferably three and permissibly in fewer or more sections 10a, 10b and 10c, i. e., outer, middle and inner in respect to the observer each of different diameter. The sections may be joined by threaded joints 11. On the right hand (the inner end) of Fig. 1 may be seen a Gauss type eyepiece 12 centrally mounted in a reticle tube 13. Also mounted in the reticle tube 13 as a means of illumination is a prism 14 beneath which, in a projecting box 15 there is a small electric lamp 16. A reticle 17 which may be marked in a manner similar to Fig. 2 contains central cross hairs 18, the Gauss eyepiece fiducial lines 19, 19a and 19b and a plurality of scale markings 20 for determining the location of an image. The lamp 16 illuminates the Gauss eyepiece fiducial lines.

At the approximate inner end of section 10b of the tube 10, there is a small tube 21, centrally mounted in respect to tube 10. In the tube 21 there is mounted a small image-forming lens 22 composed of a plurality of lens elements such as 22a and 22b. The assembly of tube 21 and lenses 22a and 22b can be moved forward and backward in the tube as shown by the double arrow on ways or guides (shown in Fig. 4) by suitable conventional means such as a knob, rack and pinion (shown in Fig. 4). The movement of this lens results in focusing the telescope. By the proper selection of the focal length of the lens 22 in conjunction with the selected focal lengths of other lenses in the system, a range in focus from two inches or less to infinity can be obtained.

Mounted in the tube section 10a is an image forming objective lens 23 composed of a plurality of elements such as 24a and 24b. Objective lens 23 is mounted near the edge of a box 25 which contains an electric lamp 26. Extending substantially from the base of lens 23 at an angle of 45° to a flange 27 of tube section 10a, there is preferably a reflecting cube 28 or alternatively a transparent mirror, reflecting prism or pellicle. Reflecting cube 28 is provided with an internal 45° transparent mirror surface shown as a line extending diagonally across the cube. A plate 29 containing an auxiliary target which is bright against a dark background, for example, a pin hole 30, is mounted slidably on the bottom on tube section 10a in such a manner that by loosening screw 31 the position of pin hole 30 can be adjusted with small handle 32 which is mounted on plate 29. Tightening screw 31 fixes the position of the interior target 30. There is, of course, a larger hole 40 in the bottom on telescope section 10a so that light from the pin hole can enter the telescope. The target 30 cooperates with the central marks on reticle 17 to establish a straight line which is coincident with the optical axis of the telescope. Target 30 is therefore auxiliary to reticle 17.

Two lenses 33 and 34, the alignment of which are to be tested, are shown, the surfaces of these lenses are considered as exterior reflecting targets. The misalignment of lens 33 has been exaggerated in order to show the off-center paths followed by the light rays 31 as a consequence. The paths of the light rays are indicated diagrammatically, only ignoring for the sake of simplicity, refraction of glass-air surfaces such as encountered at cube 28 and lens element 34. The refraction that occurs does not materially affect the performance of the instrument.

Proving the instrument

The instrument is pointed at an optically flat reflecting surface 35 and focused for infinity. The light bulb 16 is energized, thus illuminating the Gauss fiducial marks 19 by means of prism 14. A bundle of parallel rays containing rays emanating from the neighborhood of fiducial mark 19 leaves the telescope aperture bounded by flange 27 at a slight angle with the axis of the instrument. This bundle of rays is reflected from the optical surface 35 back through the aperture bounded by flange 27 imaging the fiducial mark on reticle 17. When optical surface 35 is perpendicular to the axis of the telescope and the center of cross hairs 18 is coincident with the optical axis, the image of fiducial mark 19 will lie in a position precisely half-way between marks 19a and 19b and the image of cross hair 18 will coincide with the cross hair. Thus the perpendicularity of surface 35 is determined. Upon extinguishing the light bulb 16 and energizing the light bulb 26, the auxiliary target 30 will be imaged upon the reticle 17 hereinafter called the primary real image when the telescope is focused on the virtual image of the interior auxiliary target 30 which is to the rear of surface 35. This image formed by surface 35 is a virtual image of the virtual image 36. The position of virtual image 36 and its reflection in surface 35 can be adjusted by moving plate 29. Interior auxiliary target 30 is adjusted until its primary real image on reticule 17 coincides with the intersection of cross hairs 18. The instrument is now proved for one focus position. Other focus positions should be checked by placing the reflecting surface 35 at various distances from the telescope, and adjusting it until it is perpendicular by means of the Gauss eyepiece. Then the telescope is focused on the reflection of interior auxiliary target 30 in surface 35 and checked to see whether the primary real image is still coincident with the intersection of cross hairs 18.

If the image of interior auxiliary target 30, reflected in surface 35 when the latter is placed at a number of distances and adjusted to be perpendicular to the telescope, is coincident with cross hairs 18 at all positions, then the instrument is operating satisfactorily.

Use of the instrument

One application of this instrument is indicated in Fig. 1. The two lens elements 33 and 34 which are out of alignment in respect to each other can be brought into alignment with each other and their mutual axis determined in the following manner:

a. In observing lens 34 through the telescope, the primary real image of the illuminated target 30 will be on the reticle when the telescope is focused separately on the image formed by each glass-air surface. By adjusting the relationship between the lens 34 and telescope, the primary real image of the pinhole 30 formed by each glass-air surface may be made to coincide with the intersection of cross hairs 18 on reticle 17. When this is accomplished, the lens element 34 is said to be in alignment with the telescope and the axis of lens element 34, that is, a line coincident with normals to both surfaces is coincident with the axis of the telescope.

b. The reflected images of illuminated target 30 formed by the glass-air surfaces of lens element 33 are now observed through the telescope. It will be seen by following the ray paths emanating from the interior auxiliary target pinhole 30, ignoring, for the sake of simplicity, the refraction in lens 34, that a real image will be formed approximately at point 37. The reflection of this lens 34 can be completely ignored only when lenses 33 and 34 are in alignment with each other and with the telescope. In cases in which it is desired to measure the lack of alignment, a correction will have to be made due to the power of lens 34. Ordinarily this correction is very slight because lens 34 acts as a field lens and therefore influences to only a small degree the position of the image formed by lens 33. This point is a real image of the virtual image at point 36. Lens 23 forms a secondary real image of image 37 at point 38. Lens 22 forms a primary real image 39 on reticle 17 which is in effect the primary real image of the interior auxiliary targets 30 and is not coincident with the intersection of cross hairs 18. Scale markings 20 or their equivalent, such as a movable micrometer eyepiece, may be calibrated for a particular set of circumstances to measure the amount of misalignment of element 33 with respect to element 34. Or lens element 33 may be adjusted until the primary real images of the interior auxiliary target 30 reflected from both its glass-air surfaces are coincident with the intersection of crosshairs 18. Only when the surfaces are so curved that the images are in close proximity will there be two images on the reticle at one time. Ordinarily to focus on an image formed by a glass-air surface, the telescope must be focused on that image. Consequently any image formed by another glass-air surface will be out of focus and usually so far out of focus as to form only background illumination. When the primary real images of the interior auxiliary target 30, reflected from both surfaces of the lens element 33 are coincident with the intersection of the cross hairs 18. Lens element 33 is said to be in alignment with the telescope, since lens element 34 is also in alignment with the telescope, lens element 33 is said to be in alignment with lens element 34. This process can be extended to any number of elements.

Not only has the alignment of the various lens elements been checked in the above manner in relation with one another, but the optical axis of the compound lens being tested has been established. This lens axis is coincident with a normal common to all surfaces and is coincident with the optical axis of the telescope. The optical axis of the telescope can, by proper construction of the physical parts, be made to coincide with the axis of the telescope tube.

Due to the symmetrical nature of lenses, it can be seen why the refraction at each glass-air surface in front of point 36 can be ignored in aligning the elements of many optical systems with this telescope. Further, it can be shown why, in making measurements of misalignment, the markings 20 or their equivalent must be calibrated for any given set of circumstances.

Fig. 4 shows a modification adapted for vertical mounting. In this figure, the parts corresponding to those in Figs. 1 to 3 bear the same reference characters, primed. Elements shown only in the second include guides 41, a rack 42, a pinion 43 and a knob 44 adapted to actuate the pinion. The flange 27' is extended to cover the bore of the telescope, leaving an opening 45 for the ingress and egress of light. The reflecting cube 28' is arranged to face toward the opening 45, thus placing the cube 28 or its equivalent 90° in reference to the telescope from the position occupied by its corresponding member 28 in Fig. 1. Its position in respect to the alignment axis is unchanged. By "alignment axis" is meant the axis to which an exterior target or lens is to be aligned. In effect the alignment axis and the vertically mountable form shown in Fig. 4 are well adapted for use in locations where the amount of horizontal space is limited. Its operation is identical with that of the form shown in Fig. 1, when allowance is made for the fact that the telescope axis is perpendicular to the axis of alignment. The telescope axis and alignment axis are now perpendicular to each other rather than coincident.

One example of how the aligning telescope shown in Fig. 1 may be used for checking the alignment of a large jig is represented diagrammatically in Fig. 5. 50 is a diagrammatic representation of a jig used for assembling an airplane wing. 51, 52, and 53 are bearing mounts for the proper location of aileron hinge bearings and for the sake of interchangeability of parts assembled in this jig, should be kept in accurate alignment at all times. 54, 55 and 56 are bearings located in the bearing mounts. The bearings must be kept in the proper aligned position with respect to reference points 57, 58 and 59.

The aligning telescope 60 is mounted in a bracket 61 in proper alignment with respect to reference points 57, 58 and 59. The bracket 61 may be fixed to the jig 50 or be separate from it. The original location and adjustment of the aligning telescope should be accomplished when the jig is first constructed and the operation may require the use of standard measuring devices or the location of new check points such as 62 on the jig located in the field of the telescope.

Accurately ground and polished glass or plastic elements or exterior reflecting targets 63, 64, 65, 66, 67 and 68 are fitted into each end of the bearings of the jig as shown. The term "exterior reflecting target" is used to mean an element not contained within the telescope, while "interior auxiliary target" indicates the pinpoint 36. These glass elements may have both of their end surfaces flat, or one end surface flat and the other end surfaces may be spherical-concave or convex or concave and convex or double concave or double convex. Fig. 6 shows a type which is plane concave. The concave surface 69 faces the aligning telescope. The plane surface 70 faces away from the telescope 60. In this case, the primary real image of the target in the aligning telescope formed by the plane surface 70 on the reticle 17 will give a measure or indication of the parallelism of the surface 70 with respect to a plane perpendicular to the optical axis of the telescope 60. By the proper machining of the exterior reflecting target 68, a shouldered surface 71 can be made parallel to the plane end surface 70 and therefore the orientation of surface 71 can be determined. Since the surface 71 is in contact with the machined end of the bearing 56, the orientation of this end bearing surface is determined. A similar determination made at the left-hand end of bearing 56 will indicate distortion, if any, of the bearing 56. By a similar method, bearings 55 and 54 can be checked. Images reflected from the plane surfaces of exterior reflecting targets 68, 67, 66, 65 and 64 will be progressively further away from the telescope 60 and therefore the focusing of the aligning telescope will indicate which bearing is being investigated.

The primary real image of the target 30 in the aligning telescope 60, which image is formed by the curved surface of exterior reflecting target 68 for example, falls at point 76 near the aligning telescope when the concave surface has the correct radius of curvature. The displacement of this primary real image from the axis of the telescope is a measure of the linear displacement of the glass element or exterior reflecting target 68. If the surface 70 is not perpendicular to the axis of the telescope the linear displacement of the image on the reticle 17 will also be a function of the lack of perpendicularity of exterior-reflecting target 68.

The glass exterior-reflecting targets 63, 64, 65, 66, 67 and 68 may be constructed to suit the individual jig to be tested and may contain a scale (not shown) scratched upon the plane surface 70 to provide a sighting target to be focused upon directly.

Although not always necessary, the glass elements or exterior reflecting targets, in case they are used when all are present in the system, may be colored individually to help distinguish which image is being studied. The instrument may be used with only one exterior reflecting target present in the system at a time.

Checking the accuracy of a jig of this sort is usually done by means of large heavy "masters" or less accurate means, such as stretching a piano wire through bushings placed in bearings 54, 55 and 56.

The use of this aligning telescope for checking the alignment of the bearings such as 54, 55 and 56 is faster and more accurate than previous instruments and methods and requires no large, heavy expensive "masters."

From the above description, one familiar with the art can understand how the necessity of a separate collimator, such as is used in a British system, is eliminated and how the use of two lamps in the aligning telescope provides a means of checking the instrument. Many other applications of the instrument and method will become apparent to him.

The invention claimed is:

1. In an aligning telescope for sighting on reflecting exterior targets and images formed by them, a tube, an illuminated interior auxiliary target comprising a bright mark on a dark background, said target being located near the outer end of said tube, a transparent reflector positioned on the axis of the tube at such an angle to said axis so that it reflects light from the interior auxiliary target along the axis of the tube out of the outer end of the tube, a reticle near the inner end of said tube, optical means in an intermediate position in said tube for forming a primary real image on the said reticle near the axis of said tube of the reflected images of the interior auxiliary target formed by reflecting exterior targets, focusing means operative with said optical means for focusing the primary real image when the images formed by the exterior reflecting targets are at different distances from the telescope, means for determining the location of said primary real image on said reticle with respect to the axis of said tube, and an eye piece arranged to focus on said image-location determining means.

2. In an aligning telescope for sighting on reflecting exterior targets and images formed by them, a tube, an illuminated interior auxiliary target comprising a bright mark on a dark background, said target being located to one side of the longitudinal axis so that light therefrom will be projected at an angle to the said tube axis near the outer end of said tube, a transparent reflector positioned in the tube near the outer end thereof at such an angle to the axis that it reflects light reflected from the reflecting exterior target into alignment with the tube axis, a reticle near the inner end of said tube, optical means in an intermediate position in said tube forming a secondary real image along the axis of said tube of the reflected images of the interior auxiliary target, lens in an intermediate position in the tube for focusing on the secondary real image and for forming therefrom a primary real image on said reticle, focusing means operative with said optical means for focusing the primary real image when the images formed by the exterior reflecting targets are at different distances from the telescope, means for determining the location of said primary real image on said reticle with respect to the longitudinal axis of said tube whereby the lack of alignment of the exterior target with the instrument can be determined, and an eye piece arranged to focus on the image-location determining means.

3. In an aligning telescope for sighting on reflecting exterior targets and images formed by them, a tube, an illuminated interior auxiliary target comprising a bright spot on a dark background, said target being located thereon near the outer end of said tube, positioning means for said interior auxiliary target, a reticle near the inner end of said tube, a transparent reflector positioned on the optical axis of the tube, the reflector and the auxiliary target being so positioned that light from the auxiliary target will be projected in alignment with the sight axis between the instrument and the external targets whereby the reflected light from an external target will reach the reticle in alignment with the tube axis, optical means in an intermediate position in said tube for forming a primary real image on said reticle near the longitudinal axis of said tube of the reflected images of the interior auxiliary target formed by the reflecting exterior targets, focusing means operative with said optical means for focusing the primary real image when the images formed by the exterior reflecting targets are at different distances from the telescope, means for determining the location of said real image with respect to the longitudinal axis of said tube and an eyepiece arranged to focus upon said image location determining means.

4. In an aligning telescope for sighting upon reflecting exterior targets and images formed by them, a tube, an illuminated interior auxiliary target comprising a bright spot on a dark background, said target being located thereon near the outer end of the tube, positioning means for said interior auxiliary target, a reticle near the inner end of said tube, a transparent reflector positioned on the optical axis of the tube, the reflector and the auxiliary target being so positioned that light from the auxiliary target will be projected in alignment with the sight axis between the instrument and the external targets whereby the reflected light from an external target will reach the reticle in alignment with the tube axis, optical means in an intermediate position in said tube for forming a real primary image on said reticle near the longitudinal axis of said tube of the reflected images of an interior auxiliary target formed by the reflecting exterior targets, focusing means operative with said optical means for focusing the primary real image when the images formed by the exterior reflecting targets are at different distances from the telescope, means for determining the location of said primary real image on said reticle with respect to the longitudinal axis of said tube and an eye piece arranged to focus on said image-location determining means.

5. In an aligning telescope for sighting on reflecting exterior targets and images formed by them, a series of tubes threadedly connected along a longitudinal axis to form one continuous tube, an illuminated interior auxiliary target comprising a bright mark on a dark background, said target being located thereon near the outer end of said tube, positioning means for said interior auxiliary target, a reticle near the inner end of said tube, a transparent reflector positioned on the optical axis of the tube, the reflector and auxiliary target being so positioned that light from the auxiliary target will be projected in alignment with the sight axis between the instrument and the external target whereby the reflected light from an external target will reach the reticle in alignment with the tube axis, optical means in an intermediate position in said tube for forming a primary real image on said reticle near the longitudinal axis of said tube of the reflected images of the interior auxiliary target formed by the reflecting exterior targets, a focusing means operative with said optical means for focusing the primary real image when the images formed by the exterior reflecting target are at different distances from the telescope, means for determining the location of said real image with respect to the longitudinal axis of said tube and an eye piece arranged to focus upon said image-location determining means.

6. In an aligning telescope for sighting on reflecting exterior targets and images formed by them, a tube of at least two threadedly connected parts, an illuminated interior auxiliary target comprising a bright mark on a dark background, said target being located thereon near the outer end of said tube, positioning means for said interior auxiliary target, a reticle near the inner end of said tube, a transparent reflector positioned on the optical axis of the tube, the reflector and the auxiliary target being so positioned that light from the auxiliary target will be projected in alignment with the sight axis between the instrument and the external targets whereby the reflected light from an external target will reach the reticle in alignment with the tube axis, optical means in an intermediate position in said tube for forming a primary real image on said reticle near the longitudinal axis of said tube of the reflected images of the interior auxiliary target formed by the reflecting exterior targets, focusing means operative with said optical means for focusing the primary real image when the images formed by the exterior reflecting target are at different distances from the telescope, means for determining the location of said real image with respect to the longitudinal axis of said tube, positioning means for said interior auxiliary target, and an eye piece arranged to focus upon said image-location determining means.

7. In an aligning telescope for sighting on reflecting exterior targets and images formed by them, a tube in two or more sections, an illuminated interior auxiliary target comprising a bright mark on a dark background located thereon near the outer end of said tube, a reticle near the inner end of said tube, a transparent reflector positioned on the optical axis of the tube, the auxiliary target being located at one side of the tube axis, the reflector and the auxiliary target being so positioned that light from the auxiliary target will be projected in alignment with the sight axis between the instrument and the external targets whereby the reflected light from an external target will reach the reticle in alignment with the tube axis, an objective lens intermediately positioned in said tube near said reflector to form a secondary real image near the longitudinal axis of said tube of the reflected images of the interior auxiliary target, an image forming lens intermediately positioned in said tube between said objective lens and said reticle to form a primary real image of said secondary image on said reticle, means for adjusting the separation of said objective lens and said image-forming lens for focusing, means for determining the location of said primary real image on said reticle with respect to the longitudinal axis of said tube and an eye piece arranged to focus upon said image-location determining means.

8. In an aligning telescope for sighting on a reflecting exterior target and images formed by them, a tube in two or more sections, an illuminated interior auxiliary target comprising a bright mark on a dark background located thereon near the outer end of said tube, positioning means for said interior auxiliary target, a reticle near the inner end of said tube, a transparent reflector positioned on the optical axis of the tube, the auxiliary target being located at one side of the tube axis, the reflector and the auxiliary target being so positioned that light from the auxiliary target will be projected in alignment with the sight axis between the instrument and the external targets whereby the reflected light from an external target will reach the reticle in alignment with the tube axis, an objective lens intermediately positioned in said tube near said reflector means to form a secondary real image near the longitudinal axis of said tube of the reflected images of the interior auxiliary target formed by the reflecting exterior targets, an image forming lens intermediately positioned in said tube between said objective lens and said reticle to form a primary real image of said secondary real image on said reticle, means for adjusting the separation of the said objective lens and the image-forming lens for focusing, fiducial lines upon said reticle for determining the location of primary real images with respect to the longitudinal axis of said tube, and an eye piece arranged to focus upon said fiducial lines for determining the location of said primary real image.

9. In an aligning telescope for sighting on reflecting exterior targets and images formed by them, a tube of two or more sections, an illuminated interior auxiliary target located thereon near the outer end of said tube and comprising a bright mark on a dark background, said auxiliary target being so arranged that light therefrom is projected into alignment with the reflecting exterior targets, a transparent reflector positioned on the optical axis of the tube at such an angle to the axis that it reflects light from the exterior target into alignment with the axis, said light originally emanating from the interior auxiliary target, a reticle near the inner end of said tube, optical means in an intermediate position in said tube between the said reflecting means and said reticle for forming a primary real image on said reticle near the longitudinal axis of said tube of the reflecting images of the interior auxiliary target formed by reflecting exterior targets, focusing means located in an operative position with said optical means for focusing the primary real image when the images formed by the exterior reflecting target are at different distances from the telescope, means for determining the location of said primary real image on said reticle with respect to the longitudinal axis of said tube and an eye piece arranged to focus upon said image-location determining means.

PAUL L. PRYOR.

REFERENCES CITED

The following references are of record in the file of this patent:

UNITED STATES PATENTS

| Number | Name | Date |
| --- | --- | --- |
| 1,736,682 | Tuckerman | Nov. 19, 1929 |
| 2,224,775 | Bartow | Dec. 10, 1940 |
| 2,239,469 | Reason | Apr. 22, 1941 |
| 2,380,501 | Christian et al. | July 31, 1945 |
| 2,402,856 | Turrettini | June 25, 1946 |

FOREIGN PATENTS

| Number | Country | Date |
| --- | --- | --- |
| 232,771 | Germany | Mar. 21, 1911 |
| 240,426 | Great Britain | Nov. 19, 1925 |
| 571,714 | Germany | Mar. 4, 1933 |

OTHER REFERENCES

Hardy and Perrin: "The Principles of Optics," published by McGraw-Hill Book Co. Inc., New York, 1932, pages 374 to 376 cited. Copy in Division 7.